Sept. 3, 1929. T. G. RENNERFELT 1,726,628
SELF LOCKING NUT
Filed Feb. 21, 1927
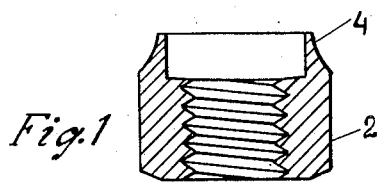
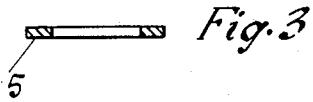
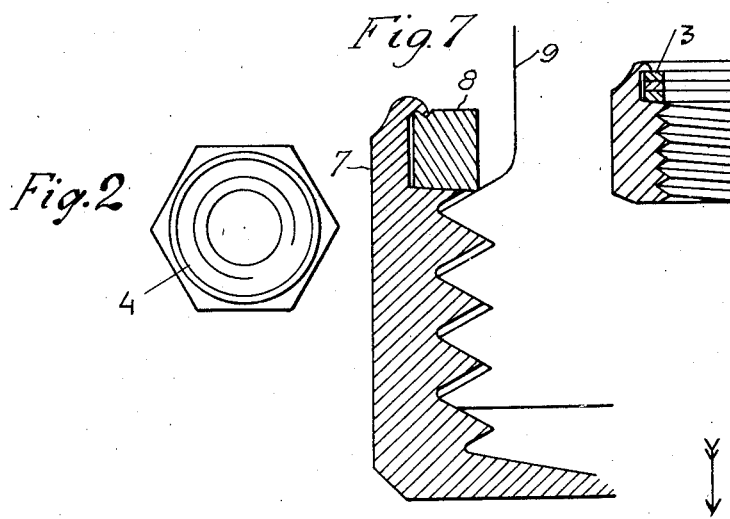
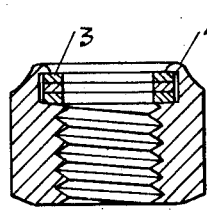
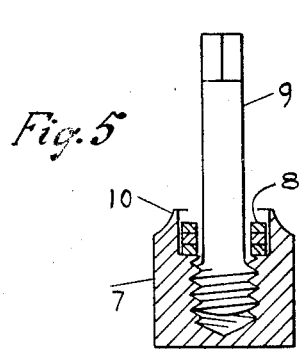
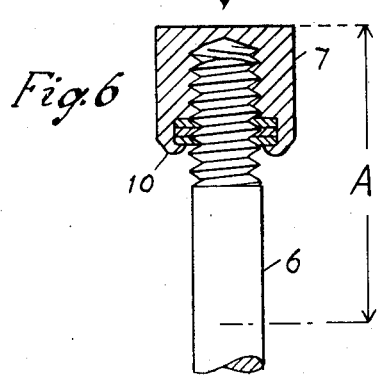
INVENTOR
Ture Gustaf Rennerfelt Patented Sept. 3, 1929.

1,726,628

UNITED STATES PATENT OFFICE.

TURE GUSTAF RENNERFELT, OF STOCKHOLM, SWEDEN.

SELF-LOCKNG NUT.

Application filed February 21, 1927. Serial No. 169,955.

My invention relates to improvements in selflocking nuts of the type referred to in my Patent 1,550,282, granted Aug. 18, 1925. The object of the improvements is to provide a reliable nut of this type which can be cheaply manufactured, and be useful to ordinary purposes and also applicable to a special purpose, as further mentioned in this specification.

To gain this object I construct my improved nut of a threaded metallic body, formed with a cylindrical cavity in which is placed a cushion of vulcanized fibre; the edge of the body is pressed or bent around the edge of the cushion so that the cushion is securely held and fastened in the body. The hole in the cushion is smaller than the diameter of the screw for which the nut is intended. The cushion is laminated, consisting of several round washers punched from sheets of vulcanized fibre.

My invention is illustrated in the accompanying drawing, in which Fig. 1 shows a section of the threaded metallic body before the cushion is inserted. Fig. 2 is a plan view of the body. Fig. 3 shows a section of the washer. Fig. 4 shows in section the nut complete. Figs. 5 and 6 illustrate the nut as constructed for a special purpose. Fig. 7 is a diagram illustrating the method of producing the nut.

In the drawing 2 denotes the metallic body, 3 the cushion, and 4 the edge which is bent or pressed over the cushion. In Figs. 4, 5 and 6 the cushion is shown as composed of three layers or washers 5 such as shown in Fig. 3. The nut shown in Fig. 4 must be applied to the screw with its threaded part first; the screw is then forced into the narrow hole in the cushion so that a thread becomes impressed into the fibre, as described in my above mentioned patent.

For some special purposes, for instance in valve gears for gasolene motors, and in certain types of steering gear for vessels, this nut must be made in such manner that the screw can be entered through the cushion first. Such an instance is shown in Fig. 6 where the nut is applied to a threaded rod 6; the nut, closed at one end, is exposed to pressure acting in the direction of the arrow, and it is desirable to adjust within narrow limits the distance A. In such cases it is necessary to provide from the beginning in the cushion a thread which shall exactly coincide with the thread in the body and in such manner that the aforesaid pressure shall be sustained by the metallic threads solely, and no part of the pressure shall fall upon the threads of the cushion. Such a thread is impressed in the manner shown in Figs. 5 and 7, where 7 denotes the body, 8 the cushion and 9 a dummy screw of the same diameter and pitch as the rod in Fig. 6. The screw 9 is entered into the body 7, the cushion is inserted, and then the edge 10 of the body is pressed over the cushion. When the dummy screw 9 is screwed out, it impresses the proper thread into the cushion because the screw, when it meets resistance from the cushion, is pressed downwards so that the loose play between the threads of body and threads of screw will become located entirely between the upper flank of the screwthread, and the lower flank of the thread in the body. The dummy screw is thus held in firm contact with just those flanks of the thread in the body which will have to sustain pressure when the finished nut, applied to the rod 6 as in Fig. 6, receives an impact or a pressure on its closed end. When the dummy screw 9 is screwed out from the body, thus impressing into the cushion a thread which fits tightly around the screw, it is evident that the thread thus obtained in the cushion is located in the correct position relatively to the body, and since the cushion is securely held so that it cannot turn within the body the said position will remain fixed and unalterable. Consequently when the threaded rod 6, instead of the dummy screw 9, is screwed into the nut as shown in Fig. 6, the aforesaid loose play will be located in exactly the same way, and therefore a pressure or impact applied to the closed end of the nut, as indicated by the arrow, will be transmitted to the screw entirely from the metallic threads of the body, so that the threads in the cushion are wholly protected from the said pressure. The aforesaid loose play is clearly shown in Fig. 7.

Vulcanized fibre is bought in the market in the form of sheets, rods or tubes, and suitable cushions may be produced from either of these forms. The structure of this material is not entirely homogeneous, and I have found by experience that washers made from the sheet are superior and better for this purpose than washers cut from rods or tubes. The sheet washer will give a surer grip on the bolt, its diameter is not much altered by moisture, and it is cheaper to produce. In some special cases I can use washers cut from various sorts of cloth or asbestos but for general purposes I consider vulcanized fibre sheet the most suitable material.

What I claim is:

The combination of a metallic body closed at one end, and provided with a threaded hole, a nonmetallic cushion held within the body, and a screw threaded with one end into the hole, the body arranged to sustain pressure acting on its closed end, the cushion being pressed around the threads of the screw with its thread engaging portion initially deflected so that its reaction tends to keep the inner flank of each thread of the screw in engagement with the opposing flank of the corresponding thread of the nut whereby impact on the closed end of said nut is entirely transmitted to the screw from the metallic threads of the nut.

Signed at Stockholm, in the Province of Stockholm and Kingdom of Sweden this 4th day of February A. D. 1927.

TURE GUSTAF RENNERFELT.